(12) United States Patent
Sasaki

(10) Patent No.: US 7,855,484 B2
(45) Date of Patent: Dec. 21, 2010

(54) INSULATING MEMBER AND STATOR

(75) Inventor: Kei Sasaki, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 93 days.

(21) Appl. No.: 12/447,600

(22) PCT Filed: Nov. 12, 2007

(86) PCT No.: PCT/JP2007/072336

§ 371 (c)(1),
(2), (4) Date: Apr. 28, 2009

(87) PCT Pub. No.: WO2008/065916

PCT Pub. Date: Jun. 5, 2008

(65) Prior Publication Data

US 2010/0052461 A1    Mar. 4, 2010

(30) Foreign Application Priority Data

Nov. 30, 2006 (JP) .............................. 2006-323998

(51) Int. Cl.
*H02K 3/34* (2006.01)
(52) U.S. Cl. ...................................... 310/194; 310/214
(58) Field of Classification Search ................ 310/194, 310/214–215
See application file for complete search history.

(56) References Cited

U.S. PATENT DOCUMENTS

| | | | | |
|---|---|---|---|---|
| 5,763,978 | A * | 6/1998 | Uchida et al. ................ | 310/215 |
| 6,057,625 | A * | 5/2000 | Stockman et al. ........... | 310/215 |
| 6,232,693 | B1 * | 5/2001 | Gierer et al. ................. | 310/214 |
| 6,590,310 | B2 * | 7/2003 | Takano ................ | 310/216.074 |
| 7,649,295 | B2 * | 1/2010 | Fukui et al. .................. | 310/215 |

FOREIGN PATENT DOCUMENTS

| | | | |
|---|---|---|---|
| JP | 59-043775 | A | 3/1984 |
| JP | 62-012907 | U | 1/1987 |
| JP | 1-110043 | * | 4/1989 |
| JP | 7-10925 | U | 2/1995 |
| JP | 7-311211 | A | 11/1995 |
| JP | 09-182342 | A | 7/1997 |
| JP | 2000-014057 | A | 1/2000 |

(Continued)

OTHER PUBLICATIONS

Japanese Office Action for corresponding Japanese Patent Application No. 2006-323998 mailed Aug. 24, 2010, 5 pages.

*Primary Examiner*—Burton Mullins
(74) *Attorney, Agent, or Firm*—Sughrue Mion, PLLC

(57) ABSTRACT

An insulator is provided between a stator core and a conductive wire provided on the stator core. The insulator includes a wound portion, around which the conductive wire is wounded, having a substantially rectangular shape; and a flange, formed in the axial end of the wound portion in the stator tooth tip side, for pressing the conductive wire in the axial direction (radial direction relative to the rotation axis of a rotor in a configuration of a rotating electrical machine). The flange includes four corner portions at its four corners, and intermediate portions formed between the four corner portions to have a width (B2) narrower than the width (B1) of the four corner portions. In addition, the flange has a tip with a curved shape.

10 Claims, 9 Drawing Sheets

FOREIGN PATENT DOCUMENTS

| | | |
|---|---|---|
| JP | 2002-095236 A | 3/2002 |
| JP | 2004-297986 A | 10/2004 |
| JP | 2005-012861 A | 1/2005 |
| JP | 2005-323477 A | 11/2005 |
| JP | 2005-354804 A | 12/2005 |

* cited by examiner

INSULATING MEMBER AND STATOR

TECHNICAL FIELD

The present invention relates to an insulating member and a stator, in particular, to an insulating member positioned between a core body and a coil provided on the core body, and a stator having the insulating member.

BACKGROUND ART

An insulating member provided between a core body and a coil has been known conventionally. For example, Japanese Patent Laying-Open 2005-323477 (Patent Document 1) describes a motor including a core member having a bobbin, made of a resin, around which a winding wire is wound and a plurality of teeth to which the bobbin is attached; and a circumferentially extending tooth bar provided in the tip of each of the teeth. The tooth bar therein is formed integrally with the bobbin and is attached to the tooth together with the bobbin.

Further, Japanese Utility Model Laying-Open 62-12907 (Patent Document 2) describes a coil bobbin having a flange with a notched portion.

Furthermore, Japanese Patent Laying-Open 59-43775 (Patent Document 3) describes a winding frame having a flange with a thickness getting thinner as it extends from its root to its tip.

The bobbin in Patent Document 1 has a complex shape, so dimensional control may be difficult. From another point of view, due to the bobbin having such a complex shape, the resin for forming the bobbin is less likely to flow into some portions in the mold during the molding of the bobbin. Deficiency in the molding is concerned. The above-mentioned problems are not sufficiently solved by the configurations described in Patent documents 2, 3 necessarily.

DISCLOSURE OF THE INVENTION

It is an object of the present invention to provide an insulating member and a stator having the insulating member, which achieve improved dimensional control/formability of the insulating member while securing a retention capability for a coil.

An insulating member according to the present invention is provided between a core body and a coil provided on the core body. The insulating member includes a wound portion, around which the coil is wound, having a substantially rectangular shape; and a flange, formed at an axial end of the wound portion, for pressing the coil in an axial direction (radial direction relative to the rotation axis of a rotor in a configuration of a rotating electrical machine).

In one aspect, in the insulating member, the flange has four corner portions at its four corners and intermediate portions that are formed between the four corner portions to have a width narrower than a width of each of the four corner portions. In this aspect, the corner portions provided in the four corners secure a retention capability for the coil, and the area of the flange is limited to narrow an area of deformation of the insulating member, thereby facilitating dimensional control.

In other aspect, in the insulating member, the flange has a tip with a curved shape. In this aspect, the flange secures a retention capability for the coil, and during molding of the insulating member, with the tip of the flange having the curved shape, a resin for forming the insulating member readily flows into a portion corresponding to the tip of the flange to improve formability of the insulating member.

It is preferable that, in the insulating member, the flange be formed to have a thickness getting thinner as the flange extends from its root to its tip. The tip of the flange, which is a free end, can secure required strength even though the thickness thereof is thinner than the root of the flange. Due to the flange getting thinner as it extends from its root to its tip as described above, the usage amount of the material for forming the insulating member can be reduced, resulting in reduction of manufacturing cost of the insulating member and weight reduction of the insulating member.

It is preferable that, in the insulating member, the wound portion be provided with a void. With this, the usage amount of the material for forming the insulating member can be reduced. Further, heat conduction from the coil to the core body is attained not only via the insulating member. This allows improved heat conductivity between the coil and the core body.

A stator according to the present invention includes a stator tooth; a stator coil wound around the stator tooth; the above-described insulating member provided between the stator tooth and the stator coil; and a resin portion formed on the stator coil and the insulating member.

According to the above configuration, in one aspect, the area of the flange of the insulating member is limited, so a stator allowing for high efficiency of heat transfer from the stator coil to the resin portion is provided. Meanwhile, in another aspect, the tip of the flange of the insulating member has a curved shape to relieve stress concentration, in the mold resin portion molding the stator coil and insulating member, at a portion located in the vicinity of the tip of the flange. Accordingly, a stator is provided in which occurrence of cracking in the mold resin portion is restrained. Furthermore, during molding of the mold resin portion, the flow of the mold resin is facilitated at the tip of the flange. Accordingly, a stator allowing for high formability of the mold resin portion is provided.

As one example, in the stator, the stator coil and the insulating member are attached to the stator tooth such that the flange is positioned adjacent to a tip of the stator tooth.

According to the present invention, the retention capability for the coil and the dimensional control/formability of the insulating member can be attained at the same time.

It should be noted that two or more of the above configurations may be combined appropriately.

BEST MODES FOR CARRYING OUT THE INVENTION

Figure 1:
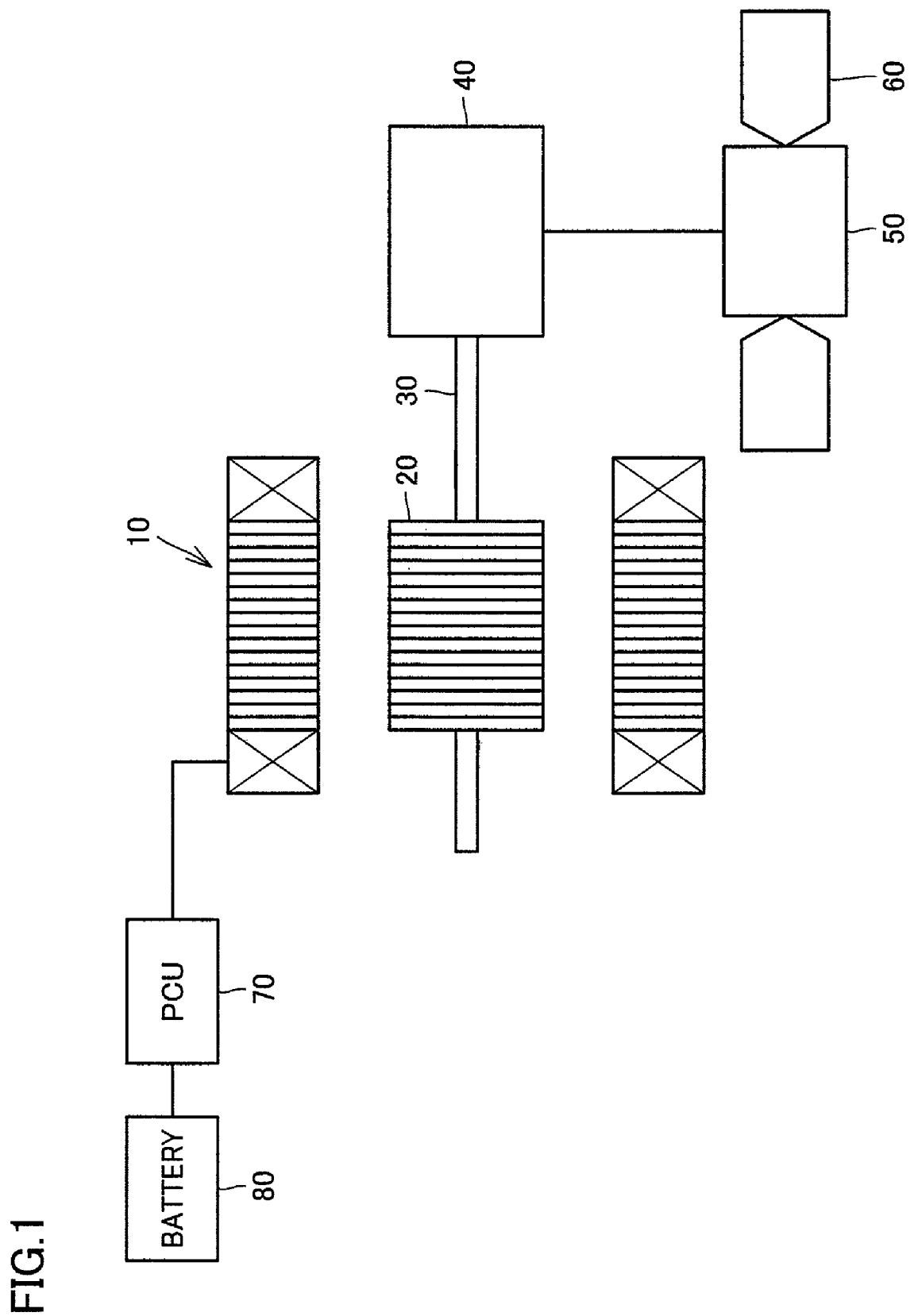
FIG. 1 schematically shows a configuration of an electrically powered vehicle including a stator according to one embodiment of the present invention.

An embodiment of the present invention will be described below. Note that the same or equivalent portions are given the same reference characters and explanation therefor may not be repeated.

When reference is made to a number, an amount, and the like in the embodiment described below, the scope of the present invention is not necessarily limited by the number, the amount, and the like unless otherwise noted. Further, in the below-described embodiment, each component is not necessarily essential for the present invention unless otherwise noted. Furthermore, if there are a plurality of embodiments below, it is initially expected to combine respective features of the embodiments, unless otherwise noted.

FIG. 1 shows a hybrid vehicle (HV), which serves as an "electrically powered vehicle", including a stator according to one embodiment of the present invention. In the specification of the present application, the "electrically powered vehicle" is not limited to the hybrid vehicle but includes, for example, a fuel cell vehicle and an electric car.

Referring to FIG. 1, the hybrid vehicle includes a stator 10, a rotor 20, a shaft 30, a speed reducing mechanism 40, a differential mechanism 50, a drive-shaft receiving unit 60, a PCU (Power Control Unit) 70, and a battery 80, which is a chargeable/dischargeable secondary battery.

Stator 10 and rotor 20 constitute a rotating electrical machine (motor generator) having a function as an electric motor or an electric generator. Rotor 20 is attached to shaft 30. Shaft 30 is rotatably supported by a housing of a driving unit via a bearing.

Stator 10 has a ring-shaped stator core. The stator core is constructed by stacking plate-like magnetic bodies of, for example, iron or an iron alloy. On the inner circumferential surface of the stator core, there are formed a plurality of stator teeth and slot portions formed between the stator teeth and each serving as a recess. The slot portions are provided to be open in the inner circumferential side of the stator core.

Around the teeth, stator coils including winding wires of three phases, a U-phase, a V-phase, and a W-phase, are wound to fit in the slot portions. The coils of the U-phase, the V-phase, and the W-phase are wounded to be offset on the circumference of the stator core. The stator coils are connected to PCU 70 via a feeder cable. PCU 70 is electrically connected to battery 80 via a feeder cable. Thus, battery 80 and the stator coils are electrically connected.

The motor generator including stator 10 and rotor 20 outputs motive power, which is then transmitted from speed reducing mechanism 40 to drive-shaft receiving unit 60 via differential mechanism 50. The driving force transferred to drive-shaft receiving unit 60 is transmitted as rotating force to a vehicular wheel (not shown) via a drive shaft (not shown), thus allowing the vehicle to travel.

Meanwhile, upon regenerative braking of the hybrid vehicle, the vehicular wheel is rotated by inertial force of the vehicular body. The vehicular wheel gives rotating force to drive the motor generator, via drive-shaft receiving unit 60, differential mechanism 50, and speed reducing mechanism 40. On this occasion, the motor generator operates as an electric power generator. The electric power generated by the motor generator is stored in battery 80 via an inverter provided within PCU 70.

Figure 2:
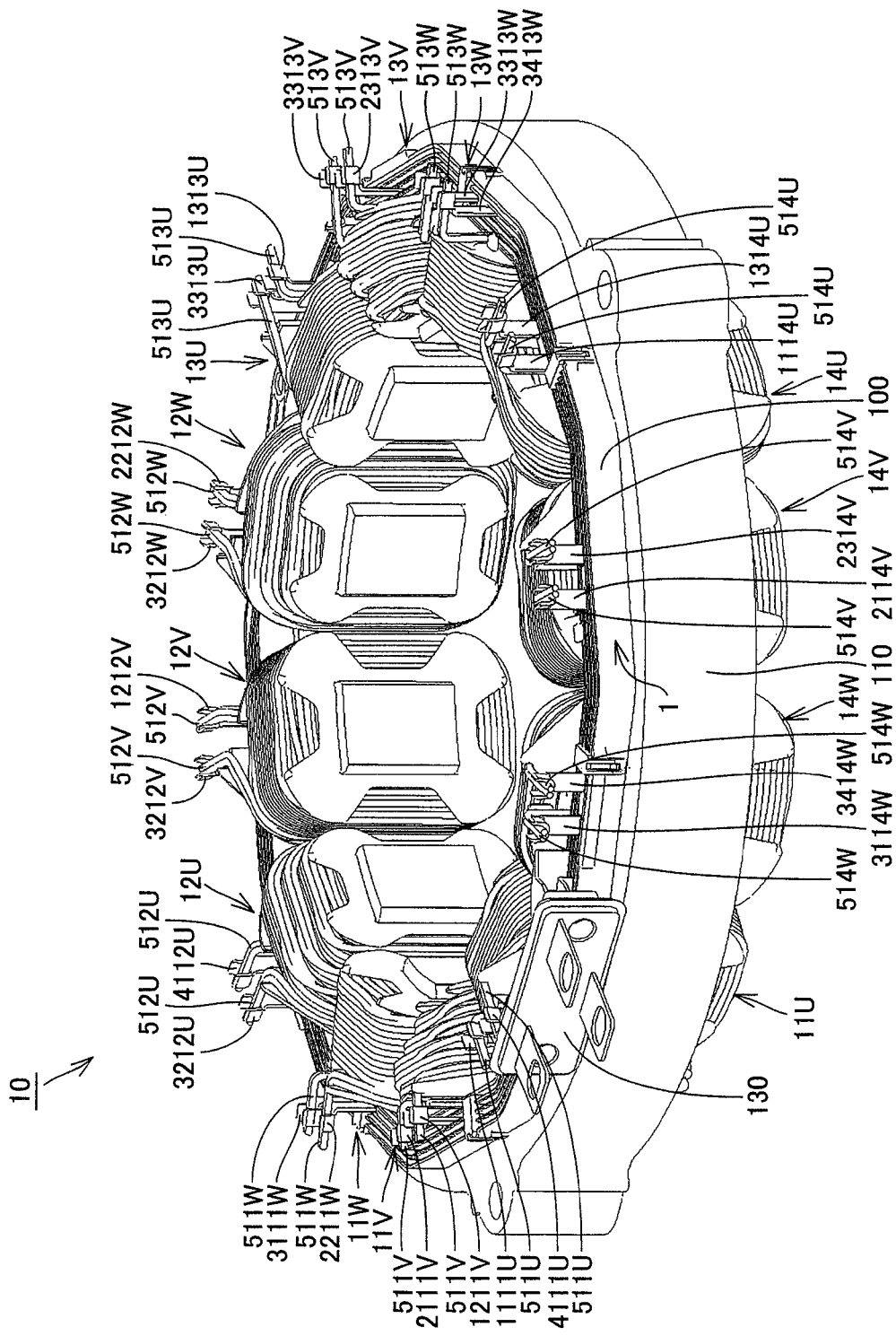
FIG. 2 is a perspective view showing the stator according to the embodiment of the present invention.
Figure 3:
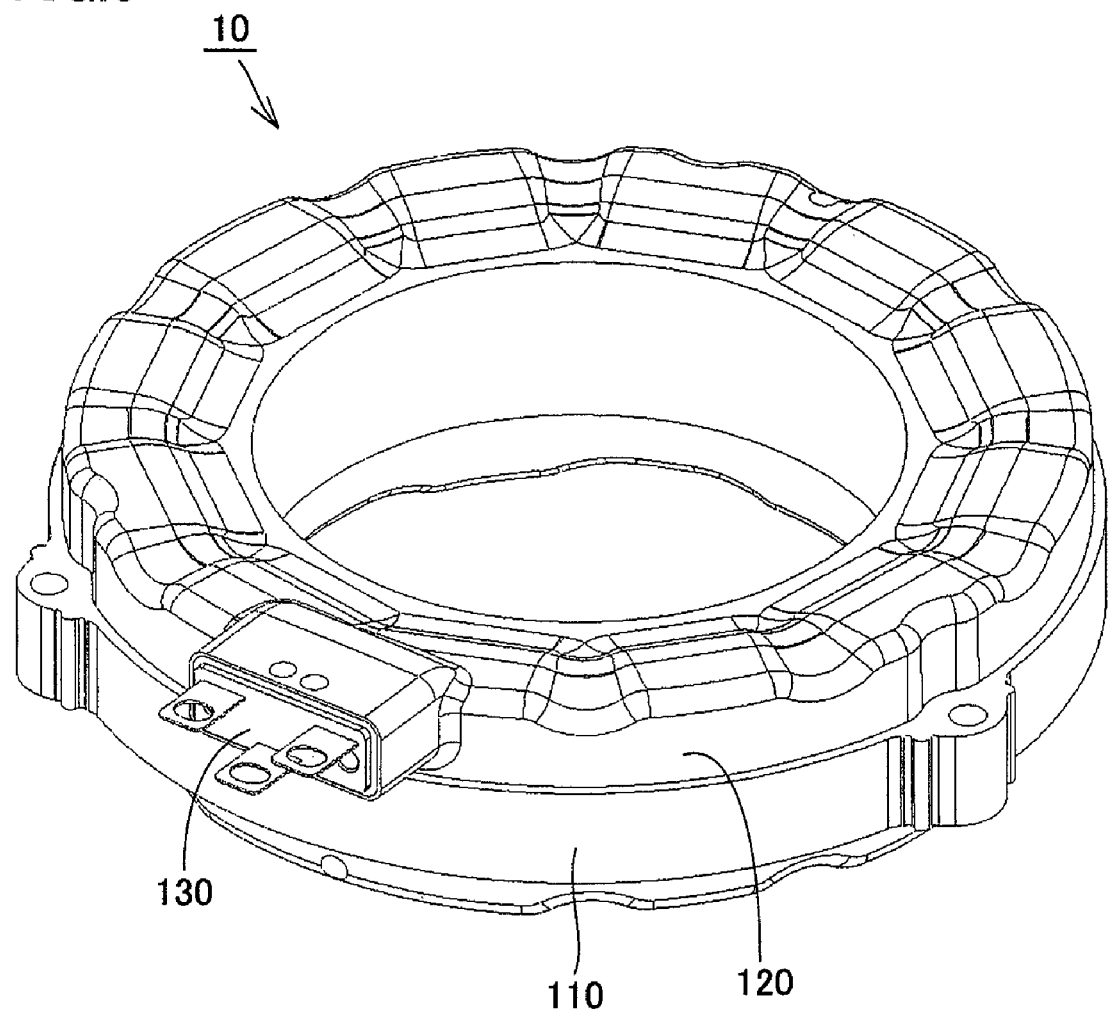
FIG. 3 shows the stator shown in FIG. 2, provided with a mold resin portion.
Figure 4:
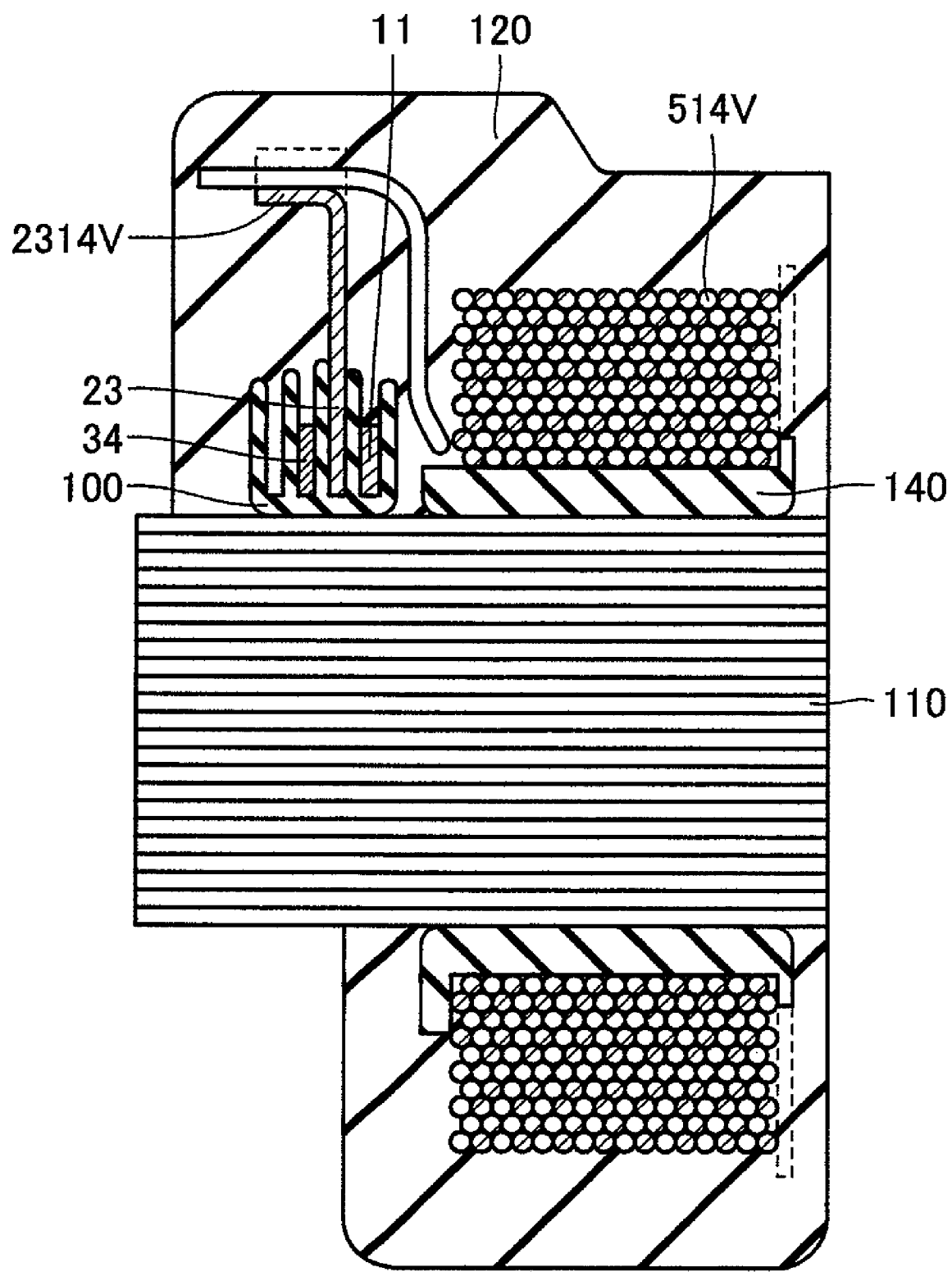
FIG. 4 is a cross sectional view of the stator shown in FIG. 3.

FIGS. 2, 3 are perspective views showing stator 10 (FIG. 2 shows it before formation of a mold resin whereas FIG. 3 shows it after the formation of the mold resin). FIG. 4 is a cross sectional view of stator 10. Referring to FIGS. 2-4, stator 10 includes stator core 110, the stator coils, bus bars to which the stator coils are connected, a terminal module 1 to which the bus bars are attached, a mold resin portion 120, a connector portion 130, and insulators 140 each serving as an "insulating member".

As shown in FIG. 2, the stator coils include first-fourth U-phase coils 11U-14U, first-fourth V-phase coils 11V-14V, and first-fourth W-phase coils 11W-14W.

First U-phase coil 11U is constructed by winding a conductive wire 511U around a tooth. Conductive wire 511U has one end connected to a first U-phase coil terminal 4111U, and the other end thereof is connected to a first U-phase coil terminal 1111U.

First V-phase coil 11V is constructed by winding a conductive wire 511V around a tooth. Conductive wire 511V has one end connected to a first V-phase coil terminal 1211V, and the other end thereof is connected to a first V-phase coil terminal 2111V.

First W-phase coil 11W is constructed by winding a conductive wire 511W around a tooth, Conductive wire 511W has one end connected to a first W-phase coil terminal 2211W, and the other end thereof is connected to a first W-phase coil terminal 3111W.

Second U-phase coil 12U is constructed by winding a conductive wire 512U around a tooth. Conductive wire 512U has one end connected to a second U-phase coil terminal 3212U, and the other end thereof is connected to a second U-phase coil terminal 4112U.

Second V-phase coil 12V is constructed by winding a conductive wire 512V around a tooth. Conductive wire 512V has one end connected to a second V-phase coil terminal 3212V, and the other end thereof is connected to a second V-phase coil terminal 1212V.

Second W-phase coil 12W is constructed by winding a conductive wire 512W around a tooth. Conductive wire 512W has one end connected to a second W-phase coil terminal 3212W, and the other end thereof is connected to a second W-phase coil terminal 2212W.

Third U-phase coil 13U is constructed by winding a conductive wire 513U around a tooth. Conductive wire 513U has one end connected to a third U-phase coil terminal 3313U, and the other end thereof is connected to a third U-phase coil terminal 1313U.

Third V-phase coil 13V is constructed by winding a conductive wire 513V around a tooth. Conductive wire 513V has one end connected to a third V-phase coil terminal 3313V, and the other end thereof is connected to a third V-phase coil terminal 2313V.

Third W-phase coil 13W is constructed by winding a conductive wire 513W around a tooth. Conductive wire 513W has one end connected to a third W-phase coil terminal 3313W, and the other end thereof is connected to a third W-phase coil terminal 3413W.

Fourth U-phase coil 14U is constructed by winding a conductive wire 514U around a tooth. Conductive wire 514U has one end connected to a fourth U-phase coil terminal 1314U, and the other end thereof is connected to a fourth U-phase coil terminal 1114U.

Fourth V-phase coil 14V is constructed by winding a conductive wire 514V around a tooth. Conductive wire 514V has one end connected to a fourth V-phase coil terminal 2314V, and the other end thereof is connected to a fourth V-phase coil terminal 2114V.

Fourth W-phase coil 14W is constructed by winding a conductive wire 514W around a tooth. Conductive wire 514W has one end connected to a fourth W-phase coil terminal 3414W, and the other end thereof is connected to a fourth W-phase coil terminal 3114W.

As shown in FIGS. 2, 4, each of the coil terminals is provided to protrude from a rail 100. The terminal has a recess that receives its corresponding conductive wire to secure connection between the conductive wire and the terminal. Each coil is wound around an insulator 140 to form a cassette coil, and then the cassette coils thus formed are installed in stator core 110.

In manufacturing stator 10, terminal module 1 is first installed on the axial end surface of stator core 110 formed by stacking electromagnetic steel plates. Then, the cassette coils formed by winding the coils around insulators 140 are fit into the teeth of stator core 110. Thereafter, mold resin portion 120 described below is formed.

Referring to FIGS. 3, 4, the rail and the coils provided on stator core 110 are molded by mold resin portion 120 constituted by a resin. This secures positioning of each of the coils and insulation between neighboring coils. Note that such molding using a resin is not limited to the one for forming a molded body as shown in FIGS. 3 and 4. An insulating resin such as varnish may be applied to surfaces of the coils to secure positioning of each coil.

Figure 5:
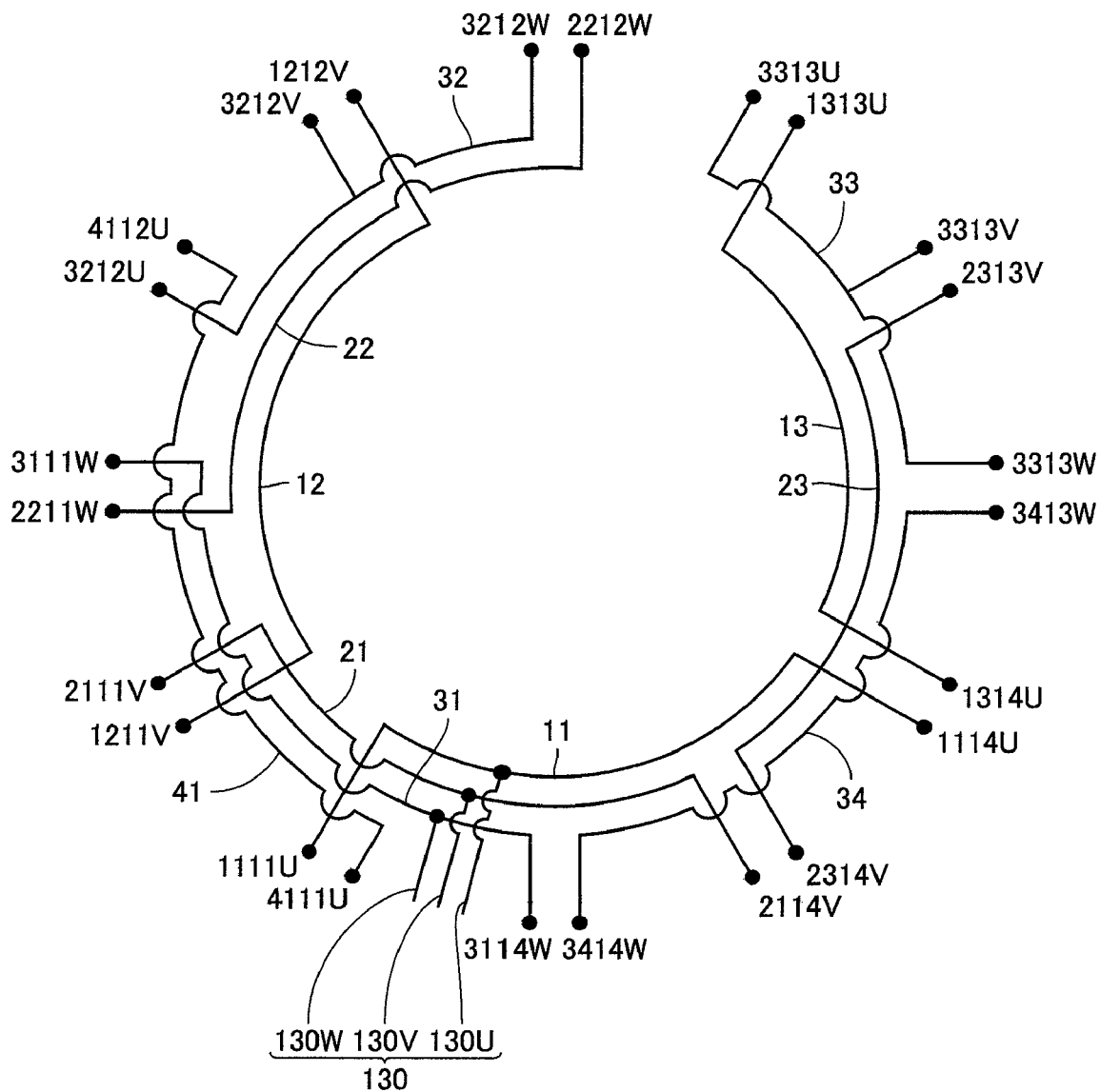
FIG. 5 schematically shows respective connections of bus bars in a rotating electrical machine terminal module shown in FIG. 2.
Figure 6:
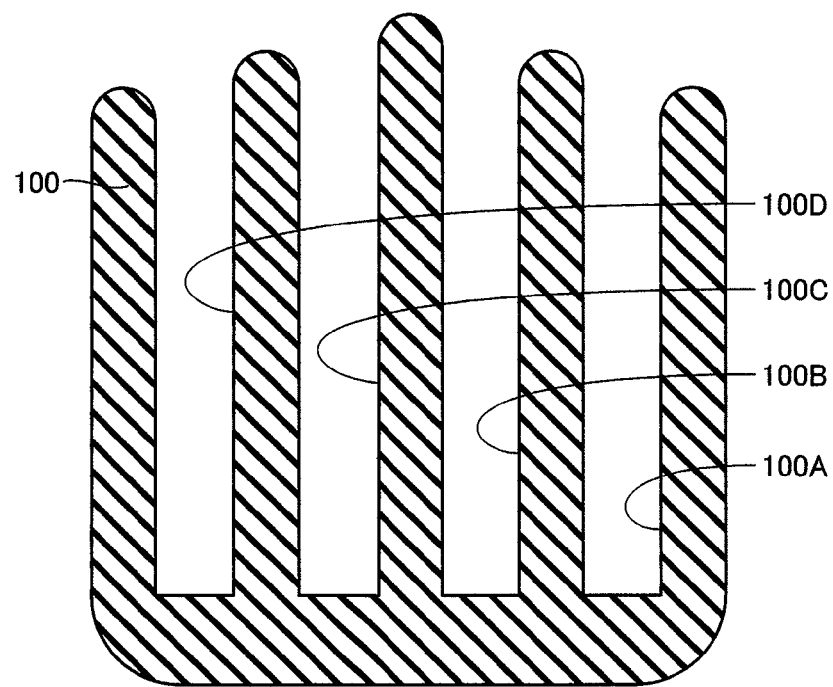
FIG. 6 is a cross sectional view showing a rail included in the rotating electrical machine terminal module shown in FIG. 2.

FIG. 5 schematically shows respective connections of the bus bars in terminal module 1. FIG. 6 is a cross sectional view showing rail 100 included in terminal module 1.

Referring to FIGS. 5, 6, rail 100 is provided with a plurality of grooves 100A, 100B, 100C, 100D arranged from the inner circumferential side to the outer circumferential side of rail 100. Note that each of grooves 100A, 100B, 100C, 100D has an interrupted shape.

The bus bars include first bus bars 11-13, second bus bars 21-23, third bus bars 31-34, and a fourth bus bar 41.

First bus bars 11, 12, 13 are fit into groove 100A. First bus bar 11 is provided with first U-phase coil terminal 1111U and fourth U-phase coil terminal 1114U. In addition, first bus bar 11 has a connector terminal 130U installed therein. Electric power from connector terminal 130U is supplied to first bus bar 11. First bus bar 12 is provided with first V-phase coil terminal 1211V and second V-phase coil terminal 1212V. First bus bar 13 is provided with third U-phase coil terminal 1313U and fourth U-phase coil terminal 1314U.

Second bus bars 21, 22, 23 are fit into groove 100B. Second bus bar 21 is provided with first V-phase coil terminal 2111V and fourth V-phase coil terminal 2114V. In addition, second bus bar 21 has a connector terminal 130V installed therein. Electric power from connector terminal 130V is supplied to second bus bar 21. Second bus bar 22 is provided with first W-phase coil terminal 2211W and second W-phase coil terminal 2212W. Second bus bar 23 is provided with third V-phase coil terminal 2313V and fourth V-phase coil terminal 2314V.

Third bus bars 31, 32, 33, 34 are fit into groove 100C. Third bus bar 31 is provided with fourth W-phase coil terminal 3114W and first W-phase coil terminal 3111W. In addition, third bus bar 31 has a connector terminal 130W installed therein. Electric power from connector terminal 130W is supplied to third bus bar 31. Third bus bar 32 is provided with second U-phase coil terminal 3212U, second V-phase coil terminal 3212V, and second W-phase coil terminal 3212W. Third bus bar 33 is provided with third U-phase coil terminal 3313U, third V-phase coil terminal 3313V, and third W-phase coil terminal 3313W. Third bus bars 32, 33 serve as neutral points connecting the U-phase, V-phase, and W-phase coils. Third bus bar 34 is provided with third W-phase coil terminal 3413W and fourth W-phase coil terminal 3414W.

Fourth bus bar 41 is fit into groove 100D. Fourth bus bar 41 is provided with first U-phase coil terminal 4111U and second U-phase coil terminal 4112U.

FIG. 5 shows a three-phase alternating-current motor of a star connection. However, the present invention is not limited to this and is applicable to, for example, a three-phase coil motor of a delta connection. Further, in the example of FIG. 5, the U-phase, V-phase, W-phase bus bars are arranged in this order when viewed in the radially inward direction, but the positions of the U-phase and W-phase bus bars may be interchanged for example.

Figure 7:
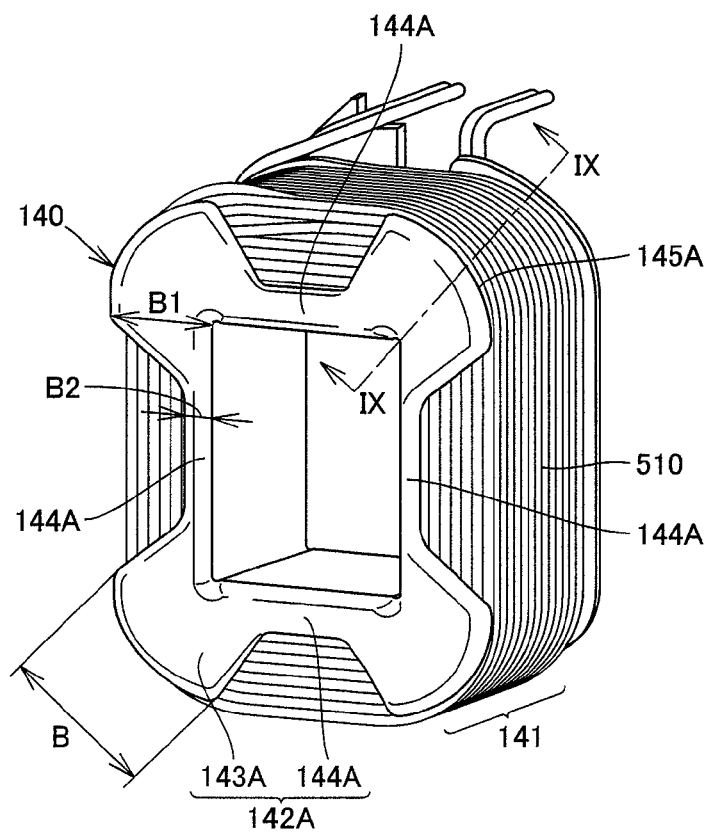
FIG. 7 is a perspective view showing a cassette coil according to the embodiment of the present invention.

FIG. 7 is a perspective view showing a cassette coil according to the present embodiment. In addition, FIG. 7 shows an insulator 140 viewed from the inner circumferential side of stator core 110. As shown in FIG. 7, the cassette coil is formed by winding a conductive wire 510 around insulator 140. Insulator 140 includes a wound portion 141 around which conductive wire 510 is wound, and a flange 142A for pressing conductive wire 510 to prevent deformation in the winding. As shown in FIG. 7, flange 142A, which is located in the inner circumferential side of stator core 110, has notches in its straight portion, apart from its four corners. In other words, flange 142A has four corner portions 143A and intermediate portions 144A located between corner portions 143A. Each of corner portions 143A has a width (B1) wider than the width (B2) of each of intermediate portions 144A. Further, flange 142A has a rounded tip surface 145A. Namely, in the cross section of flange 142A, the tip of flange 142A has a curved shape.

Figure 14:
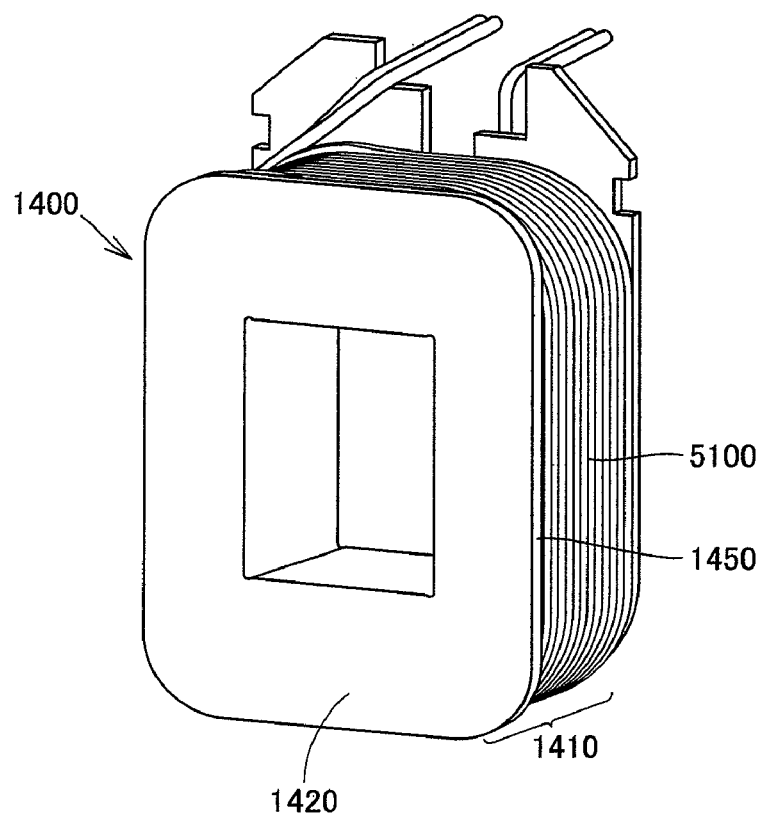
FIG. 14 is a perspective view showing a cassette coil according to a comparative example.

FIG. 14 is a perspective view showing a cassette coil according to a comparative example. Referring to FIG. 14, the cassette coil according to the comparative example is formed by winding a conductive wire 5100 around an insulator 1400. Insulator 1400 includes a wound portion 1410, around which conductive wire 5100 is wound, having a substantially rectangular shape, and a flange 1420 for pressing conductive wire 5100 to prevent deformation in the winding.

Figure 8:
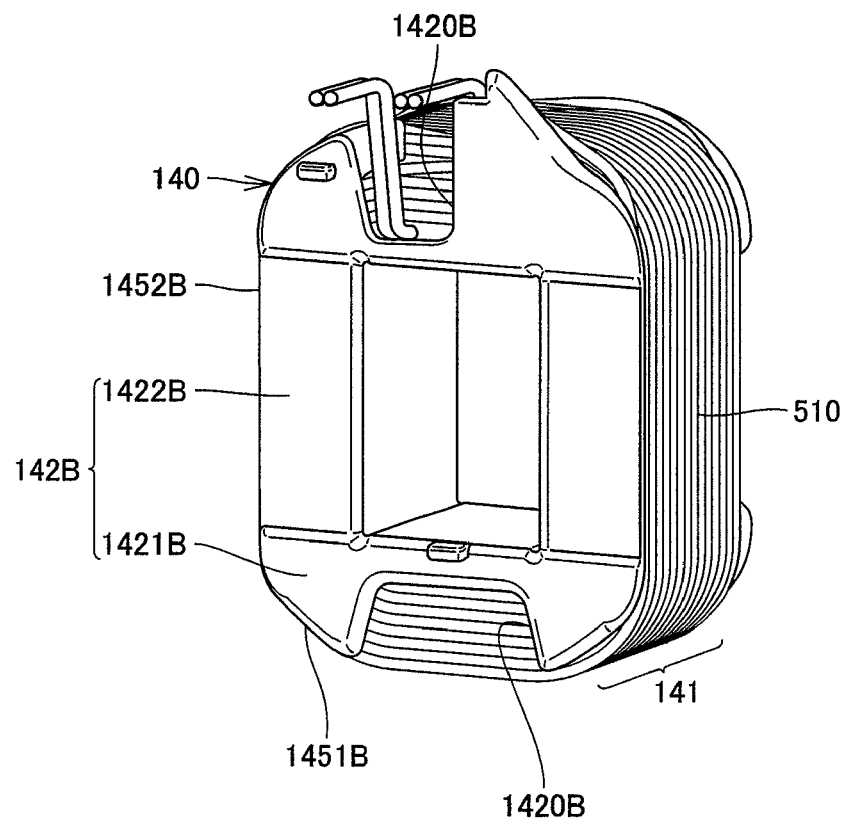
FIG. 8 is a perspective view of the cassette coil shown in FIG. 7, when viewed from the back surface side.

In the comparative example of FIG. 14, flange 1420 is formed to have a width that circumferentially entirely covers conductive wire 5100 and no notched portion is provided unlike in the example of FIGS. 7, 8. A flange is a portion that is likely to have deformation, such as warping, during molding of insulator 1400. Hence, when flange 1420 is large as in the comparative example, an area of deformation will be large, which may make dimensional control difficult. In addition, flange 1420 circumferentially entirely covering conductive wire 5100 limits improvement of efficiency of heat transfer from conductive wire 5100 to the mold resin portion. Further, since flange 1420 is large, insulator 1400 is likely to have a great influence (occurrence of thermal stress, cracking in the resin, and the like) over its surrounding resin due to a difference in a linear expansion coefficient when providing the mold resin portion.

On the contrary, in the present embodiment, in flange 142A located in the inner circumferential side of stator core 110, intermediate portions 144A each having a width narrower than those of corner portions 143A are provided. Hence, flange 142A is small and conductive wire 510 has portions not covered with flange 142A. With flange 142A being small, the usage amount of the resin, which is a raw material for forming insulator 140, can be reduced to achieve reduction of manufacturing cost of insulator 140 and weight reduction of insulator 140. Further, such a small flange 142A facilitates dimensional control of insulator 140. Further, the influence of insulator 140 over mold resin portion 120 caused by the difference in the linear expansion coefficient can be advantageously reduced. Furthermore, since conductive wire 510 has the portions not covered with flange 142A, conductive wire 510 and mold resin portion 120 are in direct contact with each other in a larger area, thereby improving efficiency of heat transfer from conductive wire 510 to mold resin portion 120.

Deformation in winding of conductive wire 510 is likely to occur in the corner portions of conductive wire 510, rather than in straight portions thereof. Therefore, the width of each of corner portions 143A over the corner portions of conductive wire 510 is relatively widened and the width of each of intermediate portions 144A over the straight portions of conductive wire 510 is relatively narrowed, to secure a retention capability for conductive wire 510 while attaining the above-mentioned advantage.

In the example of FIG. 7, the width (B) of each of corner portions 143A in an oblique direction is approximately 15 mm but may be further narrowed (to, for example, approximately 2 mm) as long as strength required for a flange can be secured.

Referring to FIG. 14 again, in the comparative example, flange 1420 has a planar end surface 1450 and has a tip with an angular portion. During molding of insulator 1400, a molten material (containing a resin dissolved therein) is less likely to flow into the angular portion, with the result that deficiency in molding is likely to occur in this portion. In addition, due to such an angular tip of flange 1420, stress concentration is likely to occur in the mold resin portion that surrounds flange 1420.

In contrast, in the present embodiment, since tip surface 145A of flange 142A is rounded, flow of a molten material containing the resin for forming insulator 140 is facilitated during molding of insulator 140 to achieve improved formability of insulator 140. Also, stress concentration is relieved in mold resin portion 120 located in the vicinity of the tip of flange 142A. Further, during molding of mold resin portion 120, flow of a molten material containing a resin for forming mold resin portion 120 is facilitated on tip surface 145A to achieve improved formability of mold resin portion 120.

FIG. 8 is a perspective view of the cassette coil shown in FIG. 7, when viewed from the back surface side thereof (the outer circumferential side of stator core 110). Referring to FIG. 8, also in the back surface side of the cassette coil, a flange 142B is provided to prevent deformation in the winding of conductive wire 510. Flange 142B has first portions 1421B axially protruding together with an coil end from the axial end surfaces of the opposite sides of the stator core, and second portions 1422B making contact with stator core 100. Each of first portions 1421B has a tip surface 1451B that is rounded as with tip surface 145A of flange 142A. Each of second portions 1422B is formed to be thinner than first portion 1421B as described below, and has a tip surface 1452B that is not rounded typically. Note that, in flange 142B, notched portions 1420B are provided only in upper and lower first portions 1421B. No notched portion is provided in second portions 1422B making direct contact with stator core 110 at the slot portion.

Figure 9:
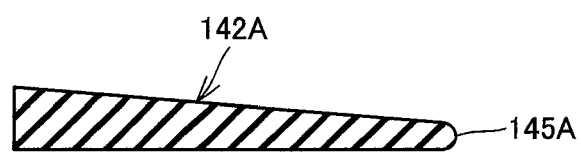
FIG. 9 is a cross sectional view taken along a line IX-IX in FIG. 7.

FIG. 9 is a cross sectional view taken along a line IX-IX in FIG. 7. Referring to FIG. 9, flange 142A is formed to be thinner in a tapered manner as it extends from its root to its tip. The tip of flange 142A, which is a free end, can secure required strength even though the thickness thereof is thinner than the root of flange 142A. Due to flange 142A getting thinner as it extends from its root to its tip as shown in FIG. 9, the usage amount of the resin for forming insulator 140 can be further reduced, resulting in further reduction of manufacturing cost of insulator 140 and further weight reduction of insulator 140.

Note that in the example of FIGS. 7-9, the thickness of flange 142A (in the root) is, for example, approximately 2 mm, the thickness of each of first portions 1421B of flange 142B is, for example, approximately 2 mm, and the thickness of each of second portions 1422B of flange 142B is, for example, approximately 0.5 mm. Namely, flange 142A is formed to be thicker than second portions 1422B of flange 142B.

The thickness of each of flanges 142A, 142B is appropriately changed. Further, the portions to be rounded in flanges 142A, 142B are also appropriately changed.

Figure 10:
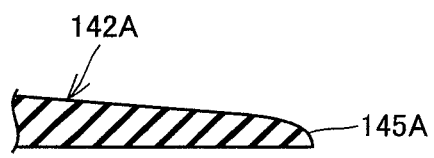
FIG. 10 shows a variation in a cross section corresponding to that in FIG. 9.

Note that flange 142A may be shaped so that only one side of tip surface 145A is rounded as shown in FIG. 10. In the example of FIG. 10, the side making contact with conductive wire 510 (the lower side thereof in FIG. 10) is not rounded. However, the side making contact with conductive wire 510 may be rounded and the other side (the upper side in FIG. 10) may not be rounded.

Figure 11:
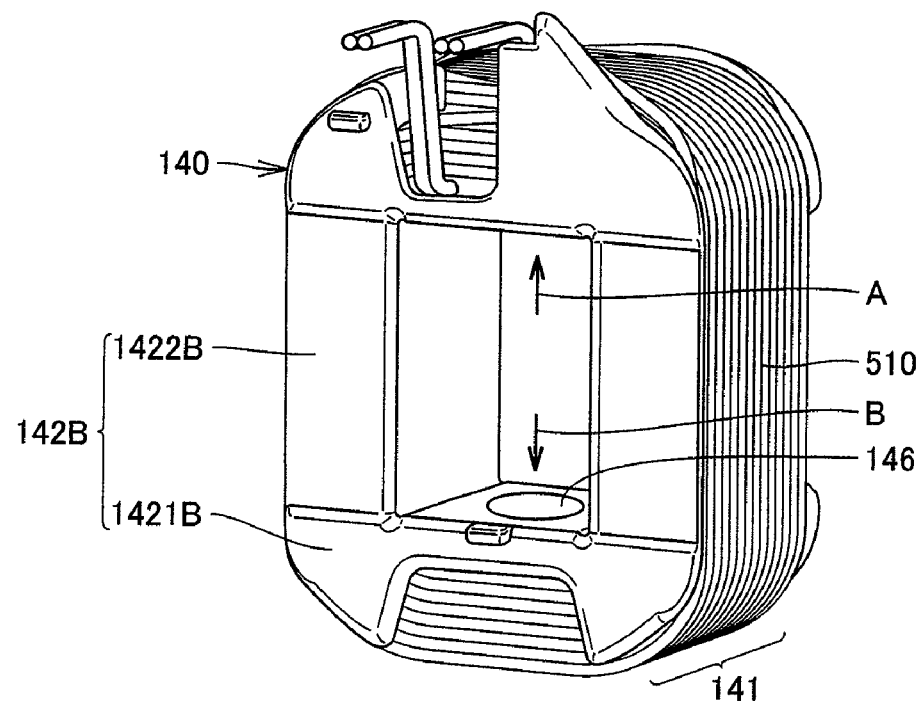
FIG. 11 is a perspective view showing a variation of the cassette coil shown in FIGS. 7-9.
Figure 12:
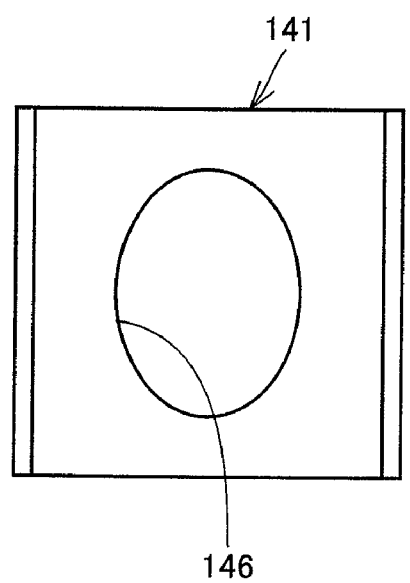
FIG. 12 shows an insulator included in the cassette coil of FIG. 11 when viewed in the direction of an arrow B.

Next, referring to FIGS. 11-13, variations of insulator 140 will be described. FIG. 12 shows an insulator 140 shown in FIG. 11, when viewed in the direction of an arrow B. As shown in FIGS. 11, 12, insulator 140 has a wound portion 141 in which a hole portion 146 serving as a "void" is formed. During molding of mold resin portion 120, the resin for forming mold resin portion 120 flows into hole portion 146. By forming hole portion 146, the usage amount of the resin for forming insulator 140 can be reduced. Further, via not only insulator 140 but also the mold resin having flowed thereinto, heat can be conducted from conductive wire 510 to stator core 110. This allows improved heat conductivity between conductive wire 510 and stator core 110.

It should be noted that a hole portion 146 similar to the above-described one is also formed in insulator 140 on a surface seen when viewed in the direction of an arrow A (the upper surface thereof in FIG. 11).

Figure 13:
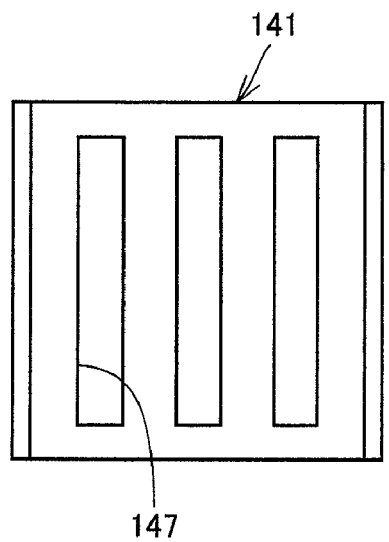
FIG. 13 shows a variation of the insulator included in the cassette coil of FIG. 11 when viewed in the direction of arrow B.

FIG. 13 shows a variation of insulator 140 shown in FIG. 11 when viewed in the same direction. As shown in FIG. 13, instead of hole portion 146, slit portions 147 may be provided.

In summary, the above description is as follows. That is, insulator 140 according to the present embodiment serving as an "insulating member" is provided between stator core 110 and conductive wire 510 (511U-514U, 511V-514V, 511W-514W) provided on stator core 110. Insulator 140 includes wound portion 141, around which conductive wire 510 is wounded, having a substantially rectangular shape; and flange 142A, formed in the axial end of wound portion 141 in the stator tooth tip side, for pressing conductive wire 510 in the axial direction (radial direction relative to the rotation axis of the rotor in the configuration of the rotating electrical machine). Flange 142A includes four corner portions 143A at its four corners, and intermediate portions 144A formed between four corner portions 143A to have a width (B2)

narrower than the width (B1) of four corner portions 143A. In addition, flange 142A has a tip with a curved shape.

Although the embodiments of the present invention have been described, it should be considered that the embodiments disclosed herein are illustrative and non-restrictive in any respect. The scope of the present invention is defined by the scope of claims, and is intended to include any modifications within the scope and meaning equivalent to the terms of the claims.

INDUSTRIAL APPLICABILITY

The present invention is applicable to, for example, a stator of a rotating electrical machine installed in a hybrid vehicle, and an insulating member included in the stator.

The invention claimed is:

1. An insulating member provided between a core body and a coil provided on said core body, comprising:
    a wound portion, around which said coil is wound, having a substantially rectangular shape; and
    a flange, formed at an axial end of said wound portion, for pressing said coil in an axial direction,
    said flange having four corner portions at its four corners and intermediate portions that are formed between said four corner portions to have a width narrower than a width of each of said four corner portions,
    said flange being provided only at the axial end of said wound portion.

2. The insulating member according to claim 1, wherein said flange is formed to have a thickness getting thinner as said flange extends from its root to its tip.

3. The insulating member according to claim 1, wherein said wound portion is provided with a void.

4. A stator comprising:
    a stator tooth;
    a stator coil wound around said stator tooth;
    the insulating member according to claim 1 provided between said stator tooth and said stator coil; and
    a resin portion formed on said stator coil and the insulating member.

5. The stator according to claim 4, wherein said stator coil and said insulating member are attached to said stator tooth such that said flange is positioned adjacent to a tip of said stator tooth.

6. The insulating member according to claim 1, wherein said flange has a tip with a curved shape.

7. The insulating member according to claim 6, wherein said flange is formed to have a thickness getting thinner as said flange extends from its root to its tip.

8. The insulating member according to claim 6, wherein said wound portion is provided with a void.

9. A stator comprising:
    a stator tooth;
    a stator coil wound around said stator tooth;
    the insulating member according to claim 6 provided between said stator tooth and said stator coil; and
    a resin portion formed on said stator coil and the insulating member.

10. The stator according to claim 9, wherein said stator coil and said insulating member are attached to said stator tooth such that said flange is positioned adjacent to a tip of said stator tooth.

* * * * *